United States Patent
Okawa et al.

(10) Patent No.: US 8,389,159 B2
(45) Date of Patent: Mar. 5, 2013

(54) NICKEL METAL HYDRIDE RECHARGEABLE BATTERY AND METHOD FOR MANUFACTURING NEGATIVE ELECTRODE THEREOF

(75) Inventors: Takashi Okawa, Kanagawa (JP); Tsuneyoshi Murakami, Kanagawa (JP); Kenichi Aoki, Osaka (JP); Hiroyuki Usui, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1371 days.

(21) Appl. No.: 11/791,521

(22) PCT Filed: Nov. 24, 2005

(86) PCT No.: PCT/JP2005/021536
§ 371 (c)(1),
(2), (4) Date: Mar. 3, 2008

(87) PCT Pub. No.: WO2006/057279
PCT Pub. Date: Jun. 1, 2006

(65) Prior Publication Data
US 2011/0014508 A1    Jan. 20, 2011

(30) Foreign Application Priority Data
Nov. 26, 2004 (JP) ................... 2004-342204

(51) Int. Cl.
*H01M 10/30* (2006.01)

(52) U.S. Cl. ............. 429/223; 429/218.1; 429/218.2; 29/623.1

(58) Field of Classification Search .......... None
See application file for complete search history.

(56) References Cited

U.S. PATENT DOCUMENTS

| | | | |
|---|---|---|---|
| 4,716,088 A * | 12/1987 | Reichman et al. | 429/101 |
| 6,586,907 B1 * | 7/2003 | Mori et al. | 320/107 |
| 6,692,812 B1 | 2/2004 | Watanabe | |

FOREIGN PATENT DOCUMENTS

| | | |
|---|---|---|
| JP | 04-206474 | 7/1992 |
| JP | 05-041209 | 2/1993 |
| JP | 05-335015 | 12/1993 |
| JP | 2002-008645 | 1/2002 |
| JP | 2004-296251 | 10/2004 |

* cited by examiner

*Primary Examiner* — Ula C Ruddock
*Assistant Examiner* — Tony Chuo
(74) *Attorney, Agent, or Firm* — McDermott Will & Emery LLP

(57) ABSTRACT

A nickel metal hydride rechargeable battery has a closed-end tubular container containing a spiral-shaped electrode assembly formed by winding a negative a positive electrode with a separator interposed therebetween such that the outermost periphery of the assembly is the negative electrode which is formed by disposing on a conductive substrate a mixture layer containing a hydrogen-absorption alloy. The positive electrode employs nickel hydroxide as an active material. In the nickel metal hydride rechargeable battery, the surface roughness of the outermost peripheral portion of the mixture layer of the negative electrode which contacts an inner side wall of the closed-end tubular container is 3.5 μM or more in terms of ten-point average roughness and is larger than the surface roughness of the other portion of the mixture layer. The reduction of oxygen gas during rapid charging is thereby facilitated without lowering the design capacity of the battery.

3 Claims, 1 Drawing Sheet

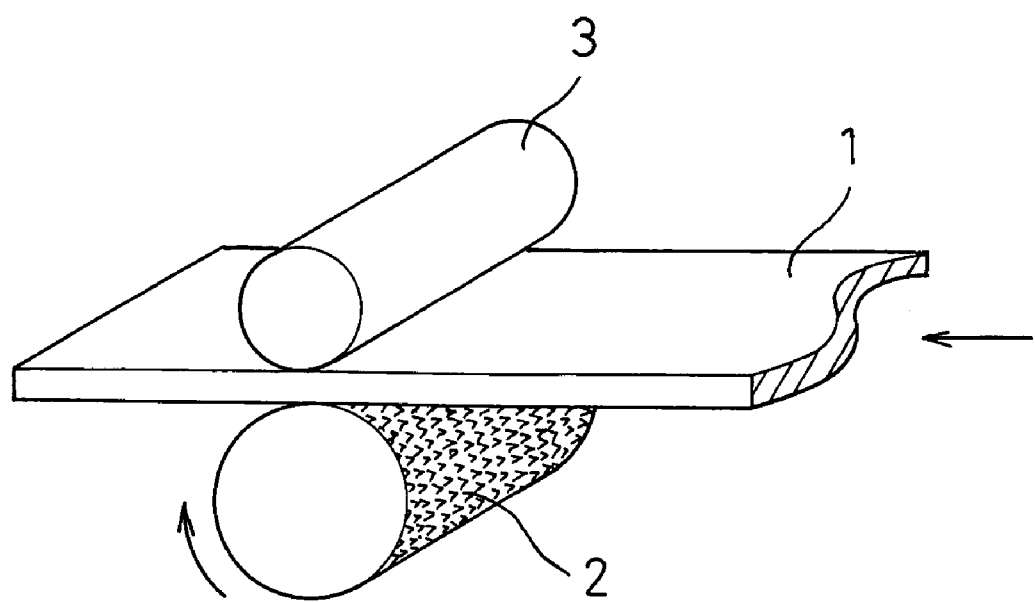

NICKEL METAL HYDRIDE RECHARGEABLE BATTERY AND METHOD FOR MANUFACTURING NEGATIVE ELECTRODE THEREOF

RELATED APPLICATIONS

This application is the U.S. National Phase under 35 U.S.C. §371 of International Application No. PCT/JP2005/021536, filed on Nov. 24, 2005, which in turn claims the benefit of Japanese Application No. 2004-342204, filed on Nov. 26, 2004, the disclosures of which Applications are incorporated by reference herein.

TECHNICAL FIELD

The present invention relates to a nickel metal hydride rechargeable battery, and more particularly to suppression of the pressure inside the battery through the improvement of its negative electrode structure.

BACKGROUND ART

An alkaline rechargeable battery is a battery repeatedly chargeable-dischargeable and has been widely used as a power source for portable devices. In particular, a nickel metal hydride rechargeable battery, which employs a hydrogen-absorption alloy as a negative electrode active material, has high energy density and is relatively environmentally clean. A nickel metal hydride rechargeable battery is therefore becoming widespread as a main power source of various portable devices.

In a current collecting method in a nickel metal hydride rechargeable battery, a closed-end tubular container which contains an electrode assembly including positive and negative electrodes serves as a negative electrode terminal, and a sealing plate insulated from the container serves as a positive electrode terminal. The positive electrode is integrated with the sealing plate through a lead to form a current collecting structure, whereas the outermost peripheral portion of the negative electrode contacts an inner side wall of the closed-end tubular container to form a current collecting structure.

In a nickel metal hydride rechargeable battery, oxygen gas generated at the positive electrode during overcharging reacts with hydrogen stored in a hydrogen-absorption alloy serving as a negative electrode active material to reduce the oxygen to water, thereby providing a reaction mechanism for spontaneously suppressing an increase of the pressure inside the battery. In order to facilitate this reaction, a method has been proposed in which a graphite intercalation compound capable of absorbing and emitting hydrogen is provided on the surface of the negative electrode to facilitate movement of oxygen gas generated at the positive electrode to the negative electrode (see, for example, Patent Document 1).

[Patent Document 1] Japanese Patent Laid-Open Publication No. Hei 5-335015.

DISCLOSURE OF THE INVENTION

Problems to be Solved by the Invention

However, when rapid charging (charging rate is 1 hour rate or more) is performed which is highly demanded in recent years, the effect of the graphite intercalation compound disclosed in Patent Document 1 is not sufficiently exerted when the thin graphite intercalation compound is provided. Here, hydrogen is most efficiently absorbed by the hydrogen-absorption alloy itself. Thus, when the graphite intercalation compound is made thick in order to obtain high rapid charging effect, the design capacity of the battery must be reduced.

The present invention is devised to solve the abovementioned problems, and it is an object of the invention to facilitate the reduction of oxygen gas during rapid charging without lowering the design capacity of a battery.

Means for Solving the Problems

In order to achieve the above object, the nickel metal hydride rechargeable battery according to the present invention has a closed-end tubular container containing a spiral-shaped electrode assembly formed by winding a negative electrode and a positive electrode with a separator interposed therebetween such that an outermost periphery of the assembly is the negative electrode, the negative electrode being formed by disposing on a conductive substrate a mixture layer containing a hydrogen-absorption alloy, the positive electrode employing nickel hydroxide as an active material. In the nickel metal hydride rechargeable battery, surface roughness of an outermost peripheral portion of the mixture layer of the negative electrode which contacts an inner side wall of the closed-end tubular container is 3.5 µm or more in terms of ten-point average roughness and is larger than surface roughness of the other portion of the mixture layer of the negative electrode.

Furthermore, a method for manufacturing a negative electrode for the nickel metal hydride rechargeable battery of the present invention is provided for obtaining the abovementioned surface structure of a mixture layer. The method includes: a first step of producing a negative electrode hoop by applying a paste of a mixture containing a hydrogen-absorption alloy to a conductive substrate and drying the paste; a second step of pressurizing and cutting the negative electrode hoop; and a subsequent third step of passing the cut negative electrode between a cylindrical grindstone and a crimping roller to grind a portion of the mixture layer with a periphery of the cylindrical grindstone, the portion being brought into contact with an inner side wall of a closed-end tubular container after the negative electrode is formed into a wound electrode assembly.

In the above configuration, the outermost periphery of the electrode assembly serves as a path for generated gas, and a portion of the surface of the negative electrode mixture layer which portion corresponds to the outermost periphery of the electrode assembly is roughened to increase the reaction area, whereby the reduction reaction of oxygen gas is facilitated without using a large amount of an additive as in Patent Document 1. Furthermore, since the portion having the roughened surface does not face the positive electrode, the problem of an internal short circuit between the positive and negative electrodes through the separator is avoided.

BRIEF DESCRIPTION OF THE DRAWINGS

FIG. 1 is a schematic diagram of a negative electrode mixture layer grinding apparatus in a manufacturing method of the present invention.

BEST MODE FOR CARRYING OUT THE INVENTION

Hereinafter, a description is given of the best mode for carrying out the invention.

As stated above, the primary feature of the present invention is that in a nickel metal hydride rechargeable battery having a closed-end tubular container containing a wound spiral-shaped electrode assembly, the surface roughness of the outermost peripheral portion of a mixture layer of a negative electrode with the outermost peripheral portion contacting an inner side wall of the closed-end tubular container is 3.5 μm or more (preferably 5 to 50 μm) in terms of ten-point average roughness and is larger than the surface roughness of the other portion of the mixture layer of the negative electrode. The reduction reaction of oxygen gas is facilitated by providing irregularity on the outermost peripheral portion of the mixture layer of the negative electrode to increase the reaction area.

More preferably, the surface roughness of the outermost peripheral portion of the mixture layer is 5 to 50 μm in terms of ten-point average roughness. The specific ten-point average roughness and the method for measuring the roughness are stipulated in Japanese Industrial Standards B0601. When the surface roughness of the outermost peripheral portion of the mixture layer is less than 5 μm, the effect of facilitating the reduction reaction of oxygen gas according to the present invention is lowered. When the surface roughness exceeds 50 μm, the number of contact points with the closed-end tubular container is decreased, and accordingly the internal resistance of the battery increases. Furthermore, the surface roughness is increased only on the outermost peripheral portion of the mixture layer which contacts the inner side wall of the closed-end tubular container. When the entire negative electrode mixture layer is roughened, a failure due to an internal short circuit is more likely to be caused by the ground powder generated during the roughening of the mixture layer or the like. Hence, a portion other than the outermost peripheral portion of the mixture layer has a surface roughness after rolling of less than about 3.5 μm (less than 3 μm in detail). The effect of the present invention can be exerted even when the surface roughness of the above portion is, for example, infinitesimally small. However, by taking into consideration the grain size of hydrogen-absorption alloy powder (10 to 30 μm on average) and the ability of an industrially practical rolling apparatus, the lower limit of the practical surface roughness is 0.5 μm in terms of ten-point average roughness.

With reference to a schematic device diagram shown in FIG. 1, a description is given of a facility for realizing the abovementioned method. After a negative electrode 1 is sandwiched between a cylindrical grindstone 2 and a clamping roller 3, the negative electrode 1 is moved to grind a portion of the mixture layer of the negative electrode 1 which contacts the periphery of the cylindrical grindstone 2. The ground portion serves as a portion which is to be brought into contact with the inner side wall of the closed-end tubular container after the negative electrode is formed into the wound electrode assembly, whereby the negative electrode for the nickel metal hydride rechargeable battery of the present invention is produced. Preferably, as shown by an arrow in FIG. 1, the rotating direction of the cylindrical grindstone 2 is opposite to the moving direction of the negative electrode 1 (the grinding direction of the mixture layer), whereby the mixture layer is ground more deeply. The surface roughness of the mixture layer after grinding depends on the abovementioned grinding direction and also is inversely proportional to the moving speed (grinding speed) of the negative electrode 1. The surface roughness can be adjusted by controlling this relationship.

In the positive electrode, nickel hydroxide is employed as an active material. To the active material, a conductive agent such as cobalt hydroxide or a metallic cobalt powder is added. In addition, if necessary, an appropriate amount of a thickening agent such as carboxymethyl cellulose (hereinafter abbreviated as CMC) and an appropriate amount of a binder such as polytetrafluoroethylene are added, thereby forming a paste. The paste is applied to or filled into a core substrate such as a three-dimensional porous body of foamed nickel, and then the core substrate is dried, rolled, and cut to produce the positive electrode.

A mixture layer containing a hydrogen-absorption alloy is used as the negative electrode 1. To the hydrogen-absorption alloy, a conductive agent such as carbon black is added. In addition, if necessary, an appropriate amount of a thickening agent such as CMC and an appropriate amount of a binder such as a styrene-butadiene copolymer (hereinafter abbreviated as SBR) are added, thereby forming a paste. The paste is applied to or filled into a core substrate such as a punched metal, and the core substrate is dried, rolled, and cut to produce the negative electrode.

A nonwoven fabric of olefin-based resin such as polypropylene may be used as the separator. The nonwoven fabric may be subjected to hydrophilic treatment such as sulfonation in accordance with need.

An aqueous solution of KOH, NaOH, and LiOH with a suitably adjusted ratio may be used as an electrolyte solution.

In the closed-end tubular container, iron or stainless may be used as a base material, and, if necessary, the base material is subjected to nickel plating for rust prevention.

Hereinafter, the present invention will be described in more detail by way of examples.

EXAMPLE 1

A hydrogen-absorption alloy of $MmNi_{3.55}Co_{0.75}Al_{0.3}Mn_{0.4}$ was pulverized to obtain particles having a diameter of 3 to 50 μm by means of a pulverizer and was subjected to immersion treatment in a hot alkaline aqueous solution. To 100 parts by weight of the hydrogen-absorption alloy, 0.2 parts by weight of CMC, 0.8 parts by weight of SBR, and water serving as a dispersion medium were added, and then the mixture was kneaded to produce a mixture paste. The mixture paste was applied to a punched metal collector subjected to nickel plating and was dried. Subsequently, this collector was rolled and cut into a predetermined size to produce a negative electrode. At this time, the ten-point average roughness of the surface of the negative electrode was 2.9 μm.

This negative electrode was sandwiched between the clamping roller 3 and the cylindrical grindstone 2 having abrasive grains adhered to the surface thereof. Then, the cylindrical grindstone 2 was rotated, and the outermost peripheral portion of the mixture layer was ground at 4 cm/sec by utilizing the driving force of the rotation to thereby produce a negative electrode for the nickel metal hydride rechargeable battery. In this negative electrode, the ten-point average roughness was 3.7 μm on the surface of the outermost peripheral portion of the mixture layer which is to be brought into contact with the inner side wall of the closed-end tubular container. This negative electrode was employed as a negative electrode for the nickel metal hydride rechargeable battery of Example 1.

EXAMPLE 2

A negative electrode for the nickel metal hydride rechargeable battery was produced which is similar to the negative electrode for the nickel metal hydride rechargeable battery of Example 1 except that the outermost peripheral portion of the mixture layer has a ten-point average roughness of 5.0 μm. Specifically, the negative electrode for the nickel metal hydride rechargeable battery of Example 1 was sandwiched between the cylindrical grindstone 2 and the clamping roller 3, and then the outermost peripheral portion was ground at a rate of 2 cm/sec by moving the negative electrode without giving a driving force to the cylindrical grindstone 2. This negative electrode was employed as a negative electrode for the nickel metal hydride rechargeable battery of Example 2.

EXAMPLE 3

A negative electrode for the nickel metal hydride rechargeable battery was produced which is similar to the negative electrode for the nickel metal hydride rechargeable battery of Example 1 except that the outermost peripheral portion of the mixture layer has a ten-point average roughness of 10 μm. Specifically, the negative electrode for the nickel metal hydride rechargeable battery of Example 1 was sandwiched between the cylindrical grindstone 2 and the clamping roller 3. Then, the cylindrical grindstone 2 was rotated while the negative electrode was moved in a direction opposite to the rotational direction, whereby the outermost peripheral portion of the mixture layer was ground at a rate of 2 cm/sec. This negative electrode was employed as a negative electrode for the nickel metal hydride rechargeable battery of Example 3.

EXAMPLE 4

A negative electrode for the nickel metal hydride rechargeable battery was produced which is similar to the negative electrode for the nickel metal hydride rechargeable battery of Example 3 except that the outermost peripheral portion of the mixture layer has a ten-point average roughness of 20 μm. Specifically, the outermost peripheral portion of the negative electrode for the nickel metal hydride rechargeable battery of Example 3 was ground at a rate of 1 cm/sec. This negative electrode was employed as a negative electrode for the nickel metal hydride rechargeable battery of Example 4.

EXAMPLE 5

A negative electrode for the nickel metal hydride rechargeable battery was produced which is similar to the negative electrode for the nickel metal hydride rechargeable battery of Example 3 except that the outermost peripheral portion of the mixture layer has a ten-point average roughness of 50 μm. Specifically, the outermost peripheral portion of the negative electrode for the nickel metal hydride rechargeable battery of Example 3 was ground at a rate of 0.5 cm/sec. This negative electrode was employed as a negative electrode for the nickel metal hydride rechargeable battery of Example 5.

EXAMPLE 6

A negative electrode for the nickel metal hydride rechargeable battery was produced which is similar to the negative electrode for the nickel metal hydride rechargeable battery of Example 3 except that the outermost peripheral portion of the mixture layer has a ten-point average roughness of 60 μm. Specifically, the outermost peripheral portion of the negative electrode for the nickel metal hydride rechargeable battery of Example 3 was ground at a rate of 0.4 cm/sec. This negative electrode was employed as a negative electrode for the nickel metal hydride rechargeable battery of Example 6.

COMPARATIVE EXAMPLE 1

A negative electrode for the nickel metal hydride rechargeable battery was produced which is similar to the negative electrode for the nickel metal hydride rechargeable battery of Example 1 except that the outermost peripheral portion of the mixture layer was not ground. This negative electrode was employed as a negative electrode for the nickel metal hydride rechargeable battery of Comparative Example 1.

COMPARATIVE EXAMPLE 2

A negative electrode for the nickel metal hydride rechargeable battery was produced which is similar to the negative electrode for the nickel metal hydride rechargeable battery of Example 4 except that the entire negative electrode mixture layer was ground. This negative electrode was employed as a negative electrode for the nickel metal hydride rechargeable battery of Comparative Example 2.

Each one of the obtained negative electrodes and a known positive electrode formed by filling an active material composed of nickel hydroxide as the main ingredient into a conductive substrate having a three-dimensional structure were laminated and wound into a spiral shape with a separator composed of a sulfonated polypropylene nonwoven fabric intervening therebetween to thereby produce a cylindrical electrode assembly. After a predetermined electrolyte solution was poured, sealing was made with a sealing plate to thereby produce a nickel metal hydride rechargeable battery.
(Evaluation of Battery Performance)

Each of the nickel metal hydride rechargeable batteries obtained under the respective conditions was measured for internal resistance and the pressure inside the battery after the battery was charged at a current of one hour rate for 1.2 hours.
(Test for Short Circuit Failure)

For each of the nickel metal hydride rechargeable batteries obtained under the respective conditions, 100 batteries were produced. Each of the produced batteries was charged under the same conditions as those for the evaluation of battery performance. Subsequently, the open circuit voltage of each of the batteries was measured. Furthermore, each of the batteries was stored at 45° C. for seven days, and the open circuit voltage of each of the batteries after storage was measured. When the voltage difference of the battery before and after the storage is 0.2 V or more, the battery was regarded as a battery having short circuit failure, and the number of such batteries was recorded.

TABLE 1

| | Rotation of cylindrical grindstone | Moving direction of negative electrode with respect to rotation of grindstone | Moving speed of negative electrode (cm/sec) | Surface roughness of negative electrode (μm) | | Battery internal pressure (MPa) | Battery internal resistance (mΩ) | Number of batteries having short circuit failure |
|---|---|---|---|---|---|---|---|---|
| | | | | Outermost peripheral portion | The other portions | | | |
| Example 1 | Rotated | same | 4 | 3.7 | 2.9 | 1.05 | 19 | 0/100 |
| Example 2 | Stopped | — | 2 | 5.0 | 2.9 | 1.00 | 20 | 0/100 |
| Example 3 | Rotated | opposite | 2 | 10 | 2.9 | 0.95 | 20 | 0/100 |
| Example 4 | Rotated | opposite | 1 | 20 | 2.9 | 0.90 | 20 | 0/100 |

TABLE 1-continued

|  | Rotation of cylindrical grindstone | Moving direction of negative electrode with respect to rotation of grindstone | Moving speed of negative electrode (cm/sec) | Surface roughness of negative electrode (μm) | | Battery internal pressure (MPa) | Battery internal resistance (mΩ) | Number of batteries having short circuit failure |
|---|---|---|---|---|---|---|---|---|
|  |  |  |  | Outermost peripheral portion | The other portions |  |  |  |
| Example 5 | Rotated | opposite | 0.5 | 50 | 2.9 | 0.80 | 21 | 0/100 |
| Example 6 | Rotated | opposite | 0.4 | 60 | 2.9 | 0.80 | 24 | 0/100 |
| Comparative Example 1 | — | — | — | 2.9 | 2.9 | 1.25 | 19 | 0/100 |
| Comparative Example 2 | Rotated | opposite | 1 | 20 | 20 | 0.75 | 21 | 3/100 |

As is clear from Table 1, in each of the batteries of Examples 1 to 6 of the present invention, the internal pressure of the battery could be suppressed during charging, in contrast to the battery of Comparative Example 1 in which the outermost peripheral portion of the negative electrode was not ground. However, in Example 1 in which the surface roughness of the outermost peripheral portion of the mixture layer is 3.7 μm, the pressure inside the battery was slightly high since the reduction reaction of oxygen gas is not sufficiently facilitated. Furthermore, in Example 6 in which the surface roughness is 60 μm, the internal resistance of the battery was slightly high since the number of contact points with the closed-end tubular container was reduced. According to these results, it was found that the preferable surface roughness of the outermost peripheral portion of the mixture layer of the negative electrode is in the range of from 5 μm to 50 μm in terms of ten-point average roughness.

Furthermore, in Comparative Example 2 in which the entire negative electrode mixture layer was ground, the number of batteries having short circuit failure was larger than that in Examples 1 to 6. This may be because ground powder formed during grinding adheres to the surface of the negative electrode mixture layer to cause an internal short circuit. It can be seen from the results that the surface roughness should be increased only on the outermost peripheral portion of the mixture layer which contacts the inner side wall of the closed-end tubular container.

INDUSTRIAL APPLICABILITY

As has been described, according to the present invention, the reduction reaction of oxygen gas during charging is facilitated. Consequently, the charging performance of the nickel metal hydride rechargeable battery is improved without reducing the capacity.

The invention claimed is:

1. A nickel metal hydride rechargeable battery comprising:
a negative electrode which is formed by disposing on a conductive substrate a mixture layer containing a hydrogen-absorption alloy;
a positive electrode employing nickel hydroxide as an active material; and
a closed-end tubular container, wherein:
the negative electrode and the positive electrode is contained in the closed-end tubular container such that the negative electrode and the positive electrode are wound with a separator interposed therebetween into spiral-shaped electrode assembly and an outermost periphery of the assembly is the negative electrode, and
surface roughness of an outermost peripheral portion of the mixture layer of the negative electrode which contacts an inner side wall of the closed-end tubular container is 3.5 μm or more in terms of ten-point average roughness and is larger than surface roughness of the other portion of the mixture layer of the negative electrode which is not in contact with the inner side wall.

2. The nickel metal hydride rechargeable battery according to claim 1, wherein the surface roughness of the outermost peripheral portion of the mixture layer of the negative electrode which contacts the inner side wall of the closed-end tubular container is in a range of from 5 to 50 μm in terms of ten-point average roughness.

3. The nickel metal hydride rechargeable battery according to claim 1, wherein the surface roughness of the other portion of the mixture layer of the negative electrode is more than 0.5 μm to less than 3.0 μm in terms of ten-point average roughness.

* * * * *